F. A. HOMES.
AIR BRAKE FOR VEHICLES.
APPLICATION FILED DEC. 18, 1914.
1,187,318.
Patented June 13, 1916.
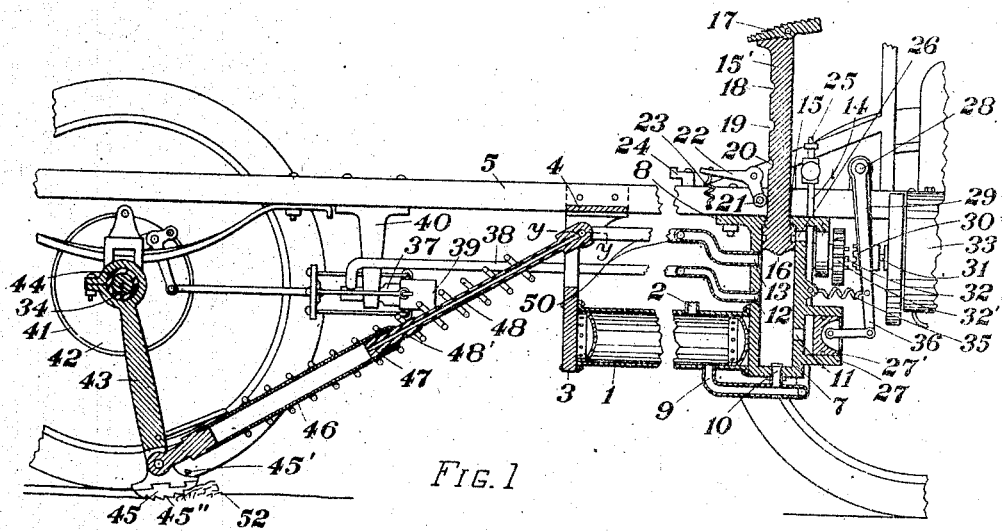
Fig. 1
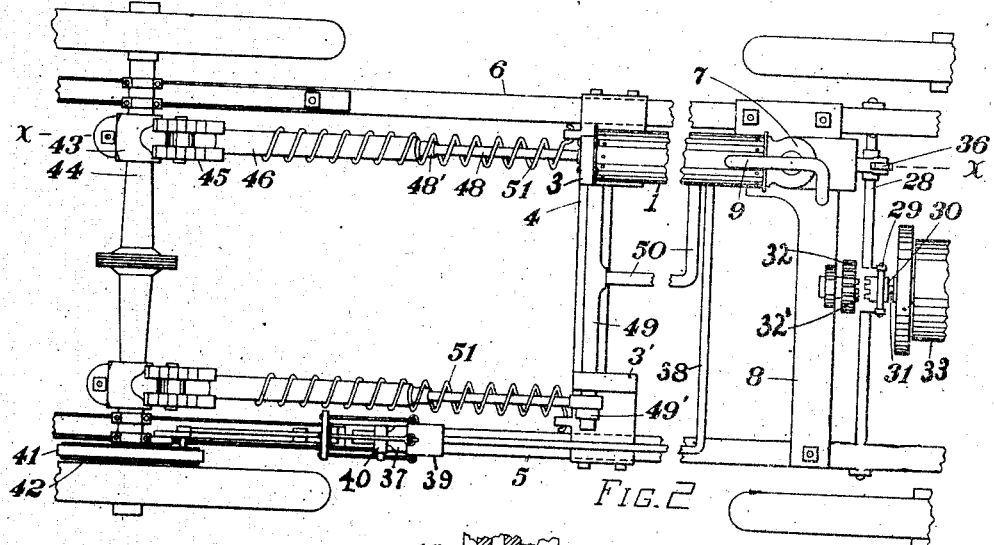
Fig. 2
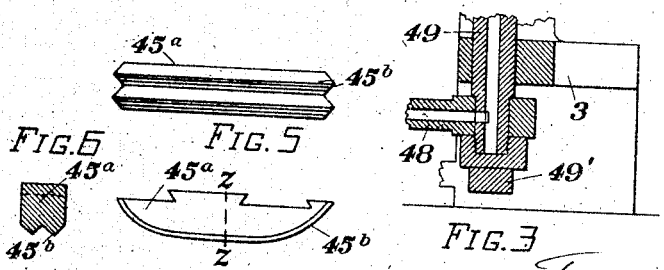
Fig. 6  Fig. 5  Fig. 3  Fig. 4
Fig. 7
WITNESSES:  Frank A. Homes INVENTOR.
BY George W. Hinton
ATTORNEYS.

UNITED STATES PATENT OFFICE.

FRANK A. HOMES, OF ST. JOSEPH, MISSOURI.

AIR-BRAKE FOR VEHICLES.

1,187,318.  Specification of Letters Patent.  Patented June 13, 1916.

Application filed December 18, 1914. Serial No. 877,917.

*To all whom it may concern:*

Be it known that I, FRANK A. HOMES, a citizen of the United States, residing at St. Joseph, in the county of Buchanan and State of Missouri, have invented certain new and useful Improvements in Air-Brakes for Vehicles, of which the following is a specification, reference being had therein to the accompanying drawing.

My invention relates to improvements in air operated brakes for vehicles, the objects of which are, first: to provide simple, substantial, durable and efficient brakes of this class, which are adapted for use on vehicles generally, and especially on automobiles, second;—to provide air operated emergency brakes, of such construction, that lateral skidding, and also wear on the rear tires of the vehicle are prevented, and by the use of which, the vehicle may be stopped in the minimum space of time, third;—to provide air applying means, which shall first, automatically release the engine of an automobile from its power transmitter, and which can be manipulated as desired for regulating the action of the service brake, fourth;—to so construct the air applying means, that, if from any cause, such as ailment or accident to the operator, his foot should be removed from the air regulating pedal, the engine of the automobile will be released, as stated, after which the service and emergency brakes will be instantly applied, fifth,—to provide ready means for exhausting the used air, and also to provide brake returning means, whereby the brakes are returned to their normal positions, after said used air is exhausted. I attain these objects by the mechanism illustrated in the accompanying drawing, in which:—

Figure 1 is a vertical section on the line X X, seen in Fig. 2, looking downward. Fig. 2 is a bottom plan of the brakes and of certain parts of an automobile. Fig. 3 is an enlarged section in detail of one of the emergency brake pivotal air connections. Fig. 4 is a vertical section cut through the center of the service brake actuating means. Fig. 5 is an enlarged bottom plan of one of the various other forms of emergency brake shoes that may be used. Fig. 6 is a transverse section on the line Z Z, seen in Fig. 7. Fig. 7 is a side elevation of the shoe shown in Figs. 5 and 6.

Referring to Figs. 1 and 2, air is pumped under pressure, into tank 1, through pipe 2, (of which only a portion is shown,) by pumping mechanism which forms no part of this invention, and is therefore neither shown nor described. It will be understood, that in actual practice, pipe 2 is provided with the usual shut-off cock and check valve, (not shown,) for retaining air under pressure, in said tank. One end of said tank is supported by the lower end portion of bracket 3, the upper end of which is formed with tie plate 4, the ends of which are secured to rails 5 and 6, of an automobile chassis. The other end of said tank is secured to the lower end portion of controller cylinder 7, the upper end of which is formed with front tie plate 8, the ends of which are secured to rails 5 and 6. Said cylinder has inlet port 10, engine release port 11, service brake port 12, emergency brake port 13, and exhaust port 26, formed therethrough. Said ports are controlled by piston 15, provided with valve 16, formed on its lower surface; said valve being adapted to close port 10, connected with tank 1, by pipe 9. Said piston is also provided with piston rod 15′, on the upper end of which pedal 17 is oscillatably mounted. Said piston rod has notches 18, 19, and 20 formed in one of the edges thereof. Said notches are adapted to be engaged by friction roll 21, rotatably mounted in the lower end of the L shaped stop pedal 22, the central portion of which is pivotally mounted on rail 5. The free end of said pedal is provided with spring 23, adapted to actuate said lever, to press said roll against said piston rod. Button 24 is rotatably mounted on rail 5, and is adapted to be rotated over said free end of lever 22, for holding the same in position with said roll in any one of said notches, thereby holding piston 15, in any desired position, as hereinafter described.

When pedal 17 is at the lowest point of its travel, it is adapted to have its front end portion oscillated onto valve stem 25, for opening pipe 14, for permitting air to pass therethrough, from pipe 9 and tank 1, for operating a pneumatic self-starting mechanism, not shown.

Port 11 leads into cylinder 27, having piston 27′ therein. Said piston rod is connected with the lower end of crank 36, the upper end of which is secured on rock-shaft 28, which is oscillatably mounted on rails 5 and 6. On the center of said rock-shaft is secured the shift arm 29, the lower end of which engages clutch member 30, slidably splined on engine shaft 31.

Clutch member 32 is formed with gear 32', which together, are loosely mounted on said engine shaft and form part of the power transmitting means, for transmitting power from engine 33 to rear axle 34 of the automobile.

It will be understood that gear 32', in actual practice, is engaged with the remainder of such transmission and axle driving means as are now generally in use, and since said remainder of the transmission and said driving means form no part of this invention, the same are neither shown nor described. Spring 35 has one of its ends connected with cylinder 7, and its other end connected with crank 36, for normally holding said clutch members in engagement.

Port 12 is connected with plunger 37, by pipe 38 and has port 37' leading from said pipe, longitudinally through said plunger into the interior of brake cylinder 39, which latter is slidably mounted on said plunger. Said plunger has its exposed end secured in the lower end of bracket 40, the upper end of which, is secured to rail 5. Said brake cylinder is rod and L crank connected with the free end of brake band 41, for tightening said band on the edge of disk 42, and thereby setting the service brake. For brevity, I shall hereafter term these parts, service braking means. Since said rod and L crank connections are not original elements of this invention, the same are neither designated nor described in detail.

Jacks 43 have their upper ends pivotally mounted on rear axle casing 44, and their lower ends bifurcated. Each one of said bifurcated ends has a shoe 45 detachably secured therein by a set-screw 45'. Said shoes are adapted to be brought into contact with the ground, as seen in Fig. 1, engaging their teeth 45''. The lower ends of emergency brake cylinders 46 are inserted between said bifurcated ends of jacks 43 and are pivotally connected therewith. Since said cylinders and their actuating parts are alike in their construction and operation, a detailed description of one, is deemed sufficient. Apertured piston 47 is slidable in said cylinder and has the enlarged portion 48' of piston rod 48 connected therewith. The upper end of said piston rod is pivotally mounted on one end of tube 49, provided with cap 49', screwed thereon, for forming an air tight joint. Said tube is securely mounted in brackets 3 and 3', formed with tie bar 4. The center of said tube is connected with port 13, by pipe 50. Recover spring 51 has its upper end connected with tie bar 4, while its lower end is connected with the lower end portion of jack 43.

In operation, the operator sets one foot on pedal 17 and normally holds the same at the lowest extremity of its movement, with valve 16 closing port 10. While said piston is in this position, port 14 is opened and air from cylinders 46 and 39 is exhausted through their respective air conducting means, into the upper end portion of controller cylinder 7, and thence to the open air through exhaust port 26. After said air is exhausted, spring 51 draws jack 43 upward, and cylinder 46 is thereby carried upward and to the right, and is stopped by piston 47. Said jack and cylinder are thus normally carried, held in position by said spring, until the emergency brake is applied, as hereinafter described.

At the same time, the relaxation of the thus liberated elastic brake band 41, by its connected parts, moves service brake cylinder 39 toward the left. At the same time air is exhausted from release cylinder 27, through port 11, cylinder 7, and exhaust port 26, into the open air. At this juncture, spring 35 draws the free end of crank 36 and the therewith connected piston 27' toward the left, which by their connected parts moves clutch member 30 into engagement with member 32, thereby engaging engine 33 with transmission gear 32'.

For applying the described engine releasing means, the pressure of the foot of the operator is relaxed, and pressure of air from tank 1, passes through pipe 9 against valve 16, forcing it upward, upon which air presses against the bottom of piston 15, forcing the same upward past port 11, upon which, notch 19 is in register with roll 21, which is moved into said notch by action of spring 23, at which point the operator feels the action of said roll, and if he so desires, applies button 24, for holding said air controlling parts in this position. At this juncture, air passes through port 11, into cylinder 27 and forces piston 27' toward the right, which together with its connected parts releases engine 33 from transmission gear 32'. When it is desired to reëngage said engine, with said gear, button 24 is rotated from over the free end of pedal 22, by the use of the operator's other foot, and pedal 17 is pushed downward, until piston 15 is below port 11, with valve 16 again seated, for closing pipe 9, upon which the previously described engine engaging operations are repeated.

When the operator sets the service brake, he again permits pressure of air, as previously described to force piston 15 upward, until notch 20 is similarly engaged by roll 21, at which juncture air passes into cylinder 7, operates the engine releasing mechanism as previously described, and also passes through port 12, pipe 38 and plunger port 37', into service brake cylinder 39, which is thereby moved toward the right, and by the previously described connections tightens band 41 on disk 42. At this juncture, said operator may move pedal 17 slightly downward, until a part or all of said air is exhausted from cylinder 39, or he may apply button 24, for holding the service braking parts in set position. It will readily be understood, that by proper manipulation of pedal 17, any desired tension of band 41, may be obtained and regulated as desired. Button 24 is removed from over pedal 22, during such manipulations, and is normally so allowed to remain.

The emergency brakes are set, by allowing pressure of air in cylinder 7, to force piston 15 upward, to the limit of its movement, (to the position shown,) air then passes through port 13, pipe 50, tube 49, plunger rod 48 and piston 47, into cylinder 46. This causes said cylinder to move downward, overcoming spring 51, and moving jack 43, from the described raised position, to the position seen in Fig. 1, which carries shoes 45 to the surface of the ground 52.

It will be understood that the inertia of the automobile carries the upper end of jack 43 forward, while the ground has a tendency to hold said shoes in fixed position, and the thus acting forces might cause sudden concussion on all of the parts involved. In order to avoid such, piston rod 48 is of smaller diameter for permitting free egress of air therearound, from cylinder 46, while its enlarged portion 48' permits said egress of air to take place so slowly, that air is thereby practically confined, and is compressed in the upper end of cylinder 46, forming a cushion for preventing said concussion. Said emergency brakes may thus be set for stopping the automobile in the minimum space of time, or the same may be done for providing jack raising means for rear axle 44, for permitting repairs to tires, changing wheels, or the like. When the latter is done, said air is allowed to remain in the parts as described, for holding the jacks in place, until it is desired to raise the same. This is accomplished in the following manner. Pedal 17 is lowered until piston 15 is below port 13, upon which air is exhausted from the described emergency braking mechanism, as previously described. When piston 15 is at its lowest position, the same may be retained therein, by turning button 24 over the free end of pedal 22, for holding roll 21 in notch 18.

When air is exhausted, as last mentioned, the gravity of the rear portion of the automobile causes the same to move the upper ends of the jacks downward and backward, until said portion is supported on its rear wheels. At this juncture, the thus released jacks are lifted by springs 51, as described.

While I have shown and described shoes 45, as having teeth 45'' on their bottom surfaces, it is evident that the bottoms of said shoes could be differently formed, without departing from the spirit of my invention, which I reserve the right to do. One of such other forms is shown in Figs. 5, 6, and 7, in which, shoe 45$^a$ has corrugations 45$^b$, formed longitudinally on its bottom surface. Said corrugations being straight offer less adherence to the ground, than the shoe 45, and also provide anti-skidding means, preventing lateral sliding of said shoe.

Having fully described my invention, what I claim as new, and desire to secure by Letters Patent, is:—

1. In air brakes for vehicles, air storing means adapted to hold air under pressure; a pair of jacks having their upper ends pivoted on the rear axle of said vehicle; shoes detachably secured on the lower ends of said jacks for engaging the ground; a spring for each one of said jacks whereby the same are lifted and yieldably held in normal position with their shoes above the ground; air operated lowering means whereby said springs are overcome and the free ends of said jacks are lowered for carrying said shoes onto the ground; air cushioning means in said lowering means for cushioning the moving parts of the latter and retarding the movement of the same through the final portion of their lowering movement; air conducting means whereby said storing means and said lowering means are connected; and air controlling means in said conducting means whereby said air is controlled.

2. In air brakes for vehicles; a pair of jacks having their upper ends oscillatably mounted on the rear axle of said vehicle; a brake shoe for each one of said jacks; securing means whereby said shoes are detachably secured on the lower ends of said jacks; a cylinder for each one of said jacks the lower ends of said cylinders being pivotally connected with the free end portions of said jacks; a piston in each one of said cylinders; a piston rod for each one of said pistons; air tight pivotal mounting means whereon the upper ends of said piston rods are pivotally mounted, said mounting means, said rods and said pistons being adapted to permit passage of air therethrough into said cylinders; air storing means adapted to hold air under pressure; air conducting means for conducting air from said storing means into said pivotal mounting means; air controlling means in said air conducting means for controlling flow of air therethrough; and a pedal for operating said controlling means.

3. In air brakes for vehicles, a pair of jacks having their upper ends pivoted upon one of the axles of said vehicle; shoes on the free ends of said jacks, said shoes being adapted to be brought into contact with the ground for stopping said vehicle; a cylinder for each one of said jacks; the lower ends of said cylinders being pivotally connected with the free end portion of said jacks; a tube securely connected with said vehicle; a hollow piston rod for conducting air from each end of said tube; air tight pivotal connecting means whereby one end of each one of said rods is connected with the ends of said tube, respectively; a hollow piston in each one of said cylinders; an enlarged portion formed on the lower end of said piston rod said enlarged piston rod portion being adapted to practically close the upper end of said cylinder for temporarily holding air under pressure therein, the lower end of said piston rod portion being connected with said piston; air storing means adapted to hold air under pressure; air conducting means whereby said tube and said storing means are connected; air controlling means in said air conducting means for controlling passage of air therethrough; and recover springs for actuating recover movement of said jacks and the therewith connected parts.

In testimony whereof I affix my signature in the presence of two witnesses.

FRANK A. HOMES.

Witnesses:
  FRED HARLING, Jr.,
  E. T. REES.